United States Patent [19]

Kuwata et al.

[11] Patent Number: 5,436,020

[45] Date of Patent: Jul. 25, 1995

[54] METHOD FOR PRODUCING A FORMULATED MILK FOR INFANTS ANALOGOUS TO HUMAN MILK

[75] Inventors: Tamotsu Kuwata; Tetsuo Kaneko, both of Saitama; Tadashi Kojima, Tokyo; Toshitaka Kobayashi, Saitama; Yoshiro Yamamoto, Tokyo, all of Japan

[73] Assignee: Meiji Milk Products Company Limited, Tokyo, Japan

[21] Appl. No.: 991,397

[22] Filed: Dec. 16, 1992

Related U.S. Application Data

[63] Continuation-in-part of Ser. No. 655,599, Feb. 15, 1991, abandoned.

[30] Foreign Application Priority Data

Feb. 19, 1990 [JP] Japan ................................ 2-36118

[51] Int. Cl.$^6$ .............................................. A23C 21/00
[52] U.S. Cl. ................................... 426/583; 426/443; 426/491; 426/580; 426/801
[58] Field of Search ............... 426/580, 585, 801, 443, 426/491, 583

[56] References Cited

U.S. PATENT DOCUMENTS

| | | | |
|---|---|---|---|
| 2,708,633 | 5/1955 | Stimpson et al. | 426/580 |
| 3,201,245 | 8/1965 | Clark et al. | 426/580 |
| 3,674,500 | 7/1972 | Nagasawa et al. | |
| 3,896,240 | 7/1975 | Gruette | 426/271 |
| 4,126,607 | 11/1978 | Eastin | 426/564 X |
| 4,497,836 | 2/1985 | Marquardt et al. | 426/239 |
| 4,618,502 | 10/1986 | Beach | 426/583 |
| 4,710,387 | 12/1987 | Uiterwaal et al. | 426/72 |
| 4,849,241 | 7/1989 | Al-Mashiki et al. | 426/583 |
| 4,954,361 | 9/1990 | Girsh | 426/580 |

FOREIGN PATENT DOCUMENTS 0355399 2/1990 European Pat. Off.
63-179149 7/1988 Japan.

OTHER PUBLICATIONS

N. J. Hipp et al., "Separation of $\alpha$, $\beta$ and -Casein"; J. Dairy Sci., 35, 272 (1952).
S. Nakai et al., "Fractionation of Caseins Directly from Skimmilk . . ."; J. Dairy Sci., 55, 30 (1972).
J. Hidalgo et al., "Selective Precipitation of Whey Proteins . . ."; J. Dairy Sci., 54, 1270 (1970).
N. Melachouris, "Interactions of $\beta$-Lactoglobulin with Polyphosphates"; J. Agr. Food Chem., 20, 798 (1972).
J. McD. Armstrong et al., "On the Fractionation of $\beta$-Lactoglobulin and $\alpha$-Lactalbumin"; Biochemica et Biophysica Acta, 147, 60 (1967).
A. et al., "Fractionation of Some Bovine Whey . . ."; Preparative Biochemistry, 5(2), 131 (1975).
R. J. Pearce, "Thermal Separation of $\beta$-Lactoglobulin . . ."; Aust. J. Dairy Technol., Dec. 144 (1983).
Paul J. Skudder, "Recovery and Fractionation of proteins from . . ."; Chemistry and Industry, J., 7,810 (1983).
C. J. Amundson, "Projections—Whey Processing in the Future"; Whey Product Conference, Oct. 21–22 (1980).
Niyuuciyou et al., 1985, JP 60-54637, abstract only.
Patent Abstracts of Japan vol. 9, No. 184 (Jul. 30, 1985): "Preparation of Composition Containing Nitrogen Component in Nonprotein State".

*Primary Examiner*—Leslie A. Wong
*Attorney, Agent, or Firm*—Browdy and Neimark

[57] ABSTRACT

The present invention provides formulated milk compositions for infants analogous to human milk in which non-protein nitrogen components are abundant and the contents of $\beta$-lactoglobulin and/or $\alpha_S$ casein are reduced.

5 Claims, No Drawings

METHOD FOR PRODUCING A FORMULATED MILK FOR INFANTS ANALOGOUS TO HUMAN MILK

The present application is a continuation-in-part of application Ser. No. 07/655,599, filed Feb. 15, 1991 now abandoned.

FIELD OF THE INVENTION

The present invention relates to formulated milk compositions for infants analogous to human milk and more particularly, to formulated milk compositions for infants analogous to human milk especially with respect to nitrogen sources.

DESCRIPTION OF THE PRIOR ART

Formulated milk for infants represented by formulated milk powder has been widely utilized as synthetic nutrient food for infants instead of bovine milk. This formulated milk for infants is mainly composed of bovine milk; in order to render its composition as close as possible to that of human milk, various improvements have been made on components such as protein, sugar, lipid, mineral, vitamin, etc. Among these improvements, it is general for an improved composition of protein to adjust a ratio of casein to whey proteins to approximately 40:60, which is the ratio in human milk, by increasing the proportion of whey proteins in preparation of formulated milk for infants analogous to human milk using bovine milk protein as a base.

However, there are a lot of caseins and whey proteins and a difference in quality is seen between human milk and bovine milk. That is, casein from bovine milk is not a single protein but consists mainly of $\alpha_S$ casein, $\beta$ casein and $\kappa$ casein. On the other hand, $\alpha_S$ casein is not present but components similar to $\beta$ casein and $\kappa$ casein of bovine milk casein are contained, in the casein of human milk.

With respect to whey proteins, $\beta$-lactoglobulin which is scarcely present in human milk is contained in bovine milk in large quantities, and sometimes acts on some infants as a strong allergen. In Table 1, amounts of the respective components in bovine milk and human milk are shown.

Table 1. Property of protein in human milk and bovine milk (by Hambraeus et al.)

TABLE 1

Property of protein in human milk and bovine milk (by Hambraeus et al.)

|  | Human Milk (g/l) | Bovine Milk (g/l) |
|---|---|---|
| Casein | 2.5 | 27.3 |
| Whey protein | 6.4 | 5.8 |
| α-Lactalbumin | 2.6 | 1.1 |
| Lactoferrin | 1.7 | trace |
| β-Lactoglobulin | — | 3.6 |
| Lysozyme | 0.5 | trace |
| Serum albumin | 0.5 | 0.4 |
| Immunoglobulin A | 1.0 | 0.03 |
| Immunoglobulin G | 0.03 | 0.6 |
| Immunoglobulin M | 0.02 | 0.03 |

As is clear from Table 1, human milk lacks $\beta$-lactoglobulin but bovine milk contains 3.6 g/l of $\beta$-lactoglobulin.

A method for removing $\alpha_S$ casein from bovine milk casein and a method for removing $\beta$-lactoglobulin from bovine milk whey proteins have been reported heretofore by many researchers.

As known techniques for fractionating casein into the respective components, for example, the following methods are known.

1. Urea method [N. J. Hipp et al., J. Dairy Sci., 35, 272 (1952)]

This is a method utilizing a difference in solubility between casein components in a urea solution. After a solution of casein in 6.6 M urea is prepared, water is added to the solution to adjust the urea concentration to 4.63 M, whereby $\alpha$ casein is predominantly precipitated. Next, water is added to the filtrate to adjust the urea concentration to 1.7 M, whereby $\beta$ casein is mainly precipitated. When ammonium sulfate is further added to the filtrate in a concentration of 1.6 M, $\kappa$ casein is precipitated.

2. Alcohol precipitation method [N. J. Hipp et al., J. Dairy Sci., 35, 272 (1952)]

This is a method for fractional precipitation of the respective components of casein using the combination of precipitation from 50% alcohol solution of casein by changing temperature, pH and ionic intensity and isoelectric point precipitation from an aqueous solution.

3. Molecular sieve method [S. Nakai et al., J. Dairy Sci., 55, 30 (1972)]

This is a method for fractionating a solution of casein in urea using gel filtration carrier such as Sephadex G-100, etc.

4. Calcium precipitation method (Japanese Patent Application Laid-Open Nos. 59-91849 and 54-95768, Japanese Patent Publication No. 46-41573)

This is a method for fractionation of $\alpha_S$ casein which comprises adding divalent cations such as calcium, etc. to a casein solution.

For isolating and removing $\beta$-lactoglobulin from bovine milk whey, the following techniques are known.

1. Coprecipitation methods by high molecular polyvalent electrolytes [J. Hidalgo et al., J. Dairy Sci., 54, 1270 (1970) and N. Melachouris, J. Agr. Food Chem., 20, 798 (1972)]

These methods comprise adjusting the concentration of the added high molecular polyvalent electrolytes and pH thereby to coprecipitate with and isolate $\beta$-lactoglobulin, without reacting with $\alpha$-lactalbumin.

2. Salting-out method [J. McD. Armstrong et al., Biochemica et Biophysica Acta, 147, 60 (1967)]

According to this method, when salts are added to bovine milk whey, $\alpha$-lactalbumin precipitates but $\beta$-lactoglobulin is still dissolved, in ammonium sulfate concentration of about 27% at pH 3.5, due to different solubility in $\alpha$-lactalbumin and $\beta$-lactoglobulin. By filtration or centrifugation, these whey proteins are separated from each other.

3. Molecular sieve fractionation method [A. Ljunquist et al., Preparative Biochemistry, 5, 131 (1975)]

According to this method, fractionation is effected by gel filtration or ultrafiltration utilizing a difference in molecular weight. For example, by treating whey proteins with a membrane of which the mean fractional molecular weight is about 25,000, $\beta$-lactoglobulin is concentrated and α-lactalbumin is filtered and separated.

4. Temperature treatment separation method [R. J. Pearce, Aust. J. Dairy Technol., Dec. 144 (1983)]

This method utilizes the property that when heated at a temperature above 55° C. in the pH range of 4.2 to 4.6, α-lactalbumin aggregates much more than β-lactoglobulin does.

5. Ion exchange chromatography method [Paul J. Skudder, Chemistry and Industry J., 7, 810 (1983) and Japanese Patent Publication No. 1-31865]

According to these methods, whey proteins are passed through a layer of diethylaminoethyl cellulose or carboxymethyl cellulose ion exchanger which is capable of adsorbing protein by an electrostatic force. Next, this adsorbed protein is eluted and developed by an appropriate salt density gadient of pH gradient to separately collect α-lactalbumin and β-lactoglobulin.

6. Method for isoelectric point separation [C. H. Amundson, Whey Product Conference, Oct. 21-22 (1980)]

In general, protein has many polar groups in its molecule and its solubility becomes smallest at a pH value of its isoelectric point. In this case, where salt is present in the solution, its artions and cations bind to the polar groups of the protein to affect its solubility. In the case of whey proteins, the pH of the isoelectric point is about 4.5 in both α-lactalbumin and β-lactoglobulin. By adjusting the salt concentration or dissolution temperature at this pH, the two proteins can be separated from each other.

7. Method for enzymatic decomposition (Japanese Patent Application Nos. 63-179149 and 1-158252)

The method comprises adding a protease derived from animal or microorganism to a solution of bovine milk whey protein to enzymatically decompose primarily β-lactoglobulin.

In preparing formulated milk for infants using bovine milk protein, it has been attempted to formulate possible by reducing $α_S$ casein and β-lactoglobulin, the composition as close to that of human milk as which are foreign proteins to humans and might cause allergic response as described above, and further increasing whey protein.

For improving conventional formulated milk in terms of protein, however, attention has been primarily directed only to casein and whey proteins and hence, a ratio of bovine milk casein to whey protein formulated is simply made to be close to that of human milk by increasing whey protein; the improvement has not yet been made on protein quality.

PROBLEM TO BE SOLVED BY THE INVENTION

In general, it is well recognized that bovine milk contains up to 5 to 6% of non-protein nitrogen components other than protein. It is also recognized that the non-protein nitrogen components include a great variety of nitrogen compounds including nitrogen-containing compounds such as carnitine, creatinine, urea, phosphoethanolamine, etc.; amino acids such as glutamic acid, glycine, alanine, valine, leucine, etc.; nucleic acid-associated substances such as orotic acid, 5′ CMP, 5′ AMP, 5′ GMP, 5′ UMP, etc.

These non-protein nitrogen components have been heretofore isolated and removed as impurities when lactose is isolated and prepared from whey. In most cases, these components have been discarded.

Further in conventional formulated milk for infants of the so called whey protein potentiated type, desalted whey protein and bovine milk protein are used as nitrogen sources. However, the content of non-protein nitrogen is at best 60% of human milk, generally less than 60%.

That is, the non-protein nitrogen components amount to 18 to 30% of the nitrogen components in human milk. By increasing the whey protein, the non-protein nitrogen content in the formulated milk for infants analogous to human milk is currently somewhat increased, in general, the components are considerably lower than in human milk and amount merely to about 30 to about 50% of human milk.

MEANS TO SOLVE THE PROBLEM

The present invention has been made to solve all of the foregoing defects in the prior art with respect to nitrogen sources in formulated milk for infants. That is, an object of the present invention is to make formulated milk for infants abundant in the nonprotein nitrogen components, thereby to provide a formulated milk for infants which is analogous to human milk.

Another object of the present invention is to enrich the non-protein nitrogen components thereby to provide a formulated milk for infants which is analogous to human milk, from which β-lactoglobulin and/or $α_S$ casein have/has been reduced.

The present invention is directed to a formulated milk composition for infants which is analogous to human milk obtained by adding a non-protein nitrogen. components-containing composition obtained by treating whey or adding a product obtained by reducing β-lactoglobulin from whey or whey protein concentrate.

The present invention is also directed to a formulated milk composition for infants which is analogous human milk obtained by adding the non-protein nitrogen components-containing composition obtained by treating whey and the product obtained by reducing β-lactoglobulin from whey or whey protein concentrate.

The present invention is further directed to a formulated milk composition for infants which is analogous to human milk obtained by adding the non-protein nitrogen components-containing composition obtained by treating whey, and/or the product obtained by reducing β-lactoglobulin from whey or whey protein concentrate, and a product obtained by reducing $α_S$ casein from bovine milk casein.

The composition of the present invention containing the non-protein nitrogen components can be obtained as the permeate, which comprises treating whey through an ultrafiltration membrane, concentrating the permeate to an appropriate concentration, and crystallizing and separating lactose by filtration. The resulting filtrate is dried preferably by freeze drying, spray drying, etc. Furthermore, the composition containing the non-protein nitrogen components may also be isolated from whey to a high purity by the process described in Japanese Patent Application Laid-Open No. 60-54637.

The formulated milk composition which is analogous to human milk is prepared by using a substance containing non-protein nitrogen components prepared by the above-mentioned ways, etc., in order that the content of non-protein nitrogen can become 60% or more of that in human milk in the formulated milk composition which is analogous to human milk.

The product obtained by reducing β-lactoglobulin from the whey protein concentrate which is used in the present invention can be obtained by dissolving whey or whey protein concentrate in water followed by the following known methods: (1) after or without desalting, the solution is brought into contact and reacted with an ion exchanger of the carboxymethyl cellulose type at pH of 4.3 to 4.6 to make β-lactoglobulin adsorbed onto the ion exchanger, whereby the product is obtained as an α-lactalbumin-rich fraction (Japanese Patent Application Laid-Open No. 63-39545); (2) after adjusting the pH to 3.6 to 5.0, the pH-adjusted solution is heated to 40° to 80° C. to thermally aggregate α-lactalbumin, whereby the product is obtained as an α-lactalbumin-rich fraction (Japanese Patent Application Laid-Open No. 61-268138); (3) the solution is subjected to enzymatic hydrolysis at pH 7.5 to 9.0 and at a temperature of 30° to 38° C., with trypsin, chymotrypsin or a serine protease represented by a protease of *Bacillus subtilis* origin or a protease of *Aspergillus oryzae* origin to enzymatically decompose β-lactoglobulin predominantly (Japanese Patent Application Nos. 63-179149 and 1-158252); or using Method (1) and Method (2) or (3) in combination.

Since a human milk does not inherently contain β-lactoglobulin, it is basically desirable that a formulated milk does not contain β-lactoglobulin. However, in consideration of a production cost it is desirable to use a product obtained by decreasing the content of β-lactoglobulin of a whey protein concentrate by the above-mentioned ways, etc., in order that the ratio of the amount of β-lactoglobulin to the amount of α-lactalbumin can become 1:1 to 1:5 in the formulated milk composition which is analogous to human milk.

The product obtained by reducing $\alpha_S$ casein from bovine milk casein which is used in the present invention may be obtained by applying the technique for fractionating $\alpha_S$ casein which comprises using acid casein, sodium casein or rennet casein, etc., adding divalent cations such as calcium, etc. to a casein solution (Japanese Patent Application Laid-Open Nos. 59-91849 and 54-95768, Japanese Patent Publication No. 46-41573).

Since a human milk does not inherently contain $\alpha_S$ casein, it is basically desirable that a formulated milk does not contain $\alpha_S$ casein. However, in consideration of a production cost, it is desirable to use a casein-containing product obtained by decreasing the content of $\alpha_S$ casein of milk casein by the above-mentioned ways, etc., in order that the ratio of the amount of $\alpha_S$ casein to the amount of β casein can become 1:1 to 1:6 in the formulated milk composition which is analogous to human milk.

EXAMPLES

The present invention is described more specifically with reference to the examples below.

Example 1

Rennet whey was treated with a clarifier to separate the remaining casein, which was then treated with a cream separator to separate cream.

The whey was then treated through an ultrafiltration membrane to give the whey permeate and the whey protein concentrate (WPC).

A whey permeate was concentrated to a solids content of 64% under reduced pressure with a concentrating machine. After seeding with lactose, the concentrate was allowed to stand in a refrigerator at 10° C. for 2 days. The formed precipitate was removed by decantation.

The resulting whey permeate concentrate was subjected to electric dialysis to remove 95% of the ion components. The composition containing the non-protein nitrogen components was thus obtained.

Next, 17 l of carboxymethyl cellulose ion exchanger was packed in a polyvinyl chloride-made column having a diameter of 45 cm and a height of 50 cm. While stirring, the pH was adjusted to 4.5 with 6N HCl. After WPC obtained by the ultrafiltration treatment described above was dissolved in water in a protein concentration of 0.5 to 1.5%, its pH was adjusted to 4.5 with 6N HCl and the solution was passed through the column at a flow rate of 25 to 30 l/hr.

A ratio of α-lactalbumin to β-lactoglobulin in the eluate through the column was 4.33:1. The product abundant in the α-lactalbumin content from which β-lactoglobulin had been reduced could be obtained.

The composition containing the non-protein nitrogen components was mixed with the product obtained by reducing β-lactoglobulin from WPC. After sterilization in a conventional manner, spray drying was performed to give a raw material suitable for preparing formulated milk for infants rich in non-protein nitrogen and α-lactalbumin.

Analytical data of this raw material are shown in Table 2. As seen from Table 2, the ratio of the amount of β-lactoglobulin to the amount of α-lactalbumin was 1:3.34 in the raw material, and the content of non-protein nitrogen components was 7.56%.

TABLE 2

|  | Whey | WPC Solution Before treatment with column | WPC Solution After treatment with column | Whey permeate after ultrafiltration | Concentrate from which crystals were separated | Spray dried product |
| --- | --- | --- | --- | --- | --- | --- |
| Protein (%) | 0.60 | 0.5 | 0.16 | 0.05 | 0.29 | 29.09 |
| β-lacto-globulin (%) | 0.42 | 0.36 | 0.03 | 0.04 | 0.20 | 6.70 |
| α-lact-albumin (%) | 0.18 | 0.13 | 0.13 | 0.01 | 0.09 | 22.39 |
| non-protein nitrogen (%) components | 0.20 | 0 | 0 | 0.13 | 2.07 | 7.56 |
| Lactose (%) | 4.49 | 0.08 | 0.08 | 3.41 | 18.81 | 53.32 |
| Ash (%) | 0.50 | 0.01 | 0.01 | 0.37 | 0.68 | 3.08 |
| Total solid (%) | 6.00 | 0.62 | 0.25 | 4.06 | 21.18 | 95.50 |
| Water (%) | 94.00 | 99.38 | 99.75 | 95.94 | 78.82 | 4.50 |

Example 2

After WPC obtained in Example 1 was dissolved in water, its pH was adjusted to 4.25 with 6N HCl. The resulting pH-adjusted solution was heated to 60° C. in a tank equipped with a stirrer and a jacket heater and kept for an hour.

Then, the WPC solution was cooled to 40° C. and separated into the precipitate and the supernatant with a centrifuging machine, Model MRPX-418, manufactured by ALFA-LAVAL Inc. The resulting precipitate was neutralized with 10% NaOH solution to give the product having reduced $\beta$-lactoglobulin from WPC.

The product was mixed with the composition containing the non-protein nitrogen components obtained in Example 1. After sterilization in a conventional manner, spray drying was performed to give a raw material suitable for preparing formulated milk for infants rich in non-protein nitrogen and $\alpha$-lactalbumin.

Example 3

In a polyvinyl chloride-made column having a diameter of 45 cm and a height of 50 cm was packed 17 l of carboxymethyl cellulose ion exchanger. While stirring, the pH was adjusted to 4.5 with 6N HCl.

The whey discharged upon preparation of Gouda cheese was treated with a clarifier to separate the remaining casein, which was then treated with a cream separator to separate cream. After the thus obtained whey was dissolved in water in a protein concentration of 0.5 wt %, its pH was adjusted to 4.5 with 6N HCl and the solution was passed through the column at a flow rate of 25 to 30 l/hr. The product from which $\beta$-lactoglobulin had been reduced was thus obtained from the whey.

The whey treated with carboxymethyl cellulose showed decrease in $\beta$-lactoglobulin, as shown in Table 3. On the other hand, the whey was rich in non-protein nitrogen, in addition to $\alpha$-lactalbumin and thus suitable for a protein raw material for preparing formulated milk for infants.

TABLE 3

|  | Whey | Treatment with Column | Spray Drying |
|---|---|---|---|
| Protein (%) | 0.55 | 0.18 | 2.19 |
| $\beta$-lactoglobulin (%) | 0.40 | 0.04 | 0.50 |
| $\alpha$-lactalbumin (%) | 0.14 | 0.14 | 1.69 |
| others (%) | 0.04 | 0.04 | 0.73 |
| Lactose (%) | 4.60 | 4.60 | 83.95 |
| Ash (%) | 0.52 | 0.50 | 9.13 |
| Total solid (%) | 5.67 | 5.26 | 96.0 |
| Water (%) | 94.32 | 94.74 | 4.0 |

Example 4

Using each of the raw materials for formulated milk for infants obtained in Examples 1 to 3, its aqueous solution of 1 wt % as the protein was prepared. The pH of the solution and its temperature were adjusted to 7 to 9 using 1N NaOH and 37° to 38° C., respectively. Bovine trypsin (Sigma Inc., T-8003) was weighed in an amount of 1 wt % based on the raw protein described above and dissolved in a small quantity of water. The solution was transferred to a sterilized Erlenmeyer's flask through a small-sized sterile filter. The whole quantity was aseptically added to the raw material solution described above. 1N NaOH was added to the mixture with stirring thereby to maintain its pH at 7 to 9 for 4 hours for enzymatic decomposition. At the time when 4 hours lapsed after initiation of the reaction, the enzyme was inactivated by heating treatment and the reaction product was spray dried.

The resulting sample was analyzed by SDS-polyacrylamide gel electrophoresis modified by Laemmli et al. It was thus confirmed that only $\beta$-lactoglobulin in the raw material described above was predominantly decomposed. This spray dried product further contained abundantly non-protein nitrogen components and $\alpha$-lactalbumin and was thus suitable for protein raw material for formulated milk for infants.

Example 5

After 1 kg of lactic acid casein was dispersed in 16 kg of water, 25 g of sodium hydroxide was added the dispersion. By heating at 85° C. for to a minutes, casein was dissolved therein. A protein concentration in the solution was about 5% and its pH was 7.0.

After the solution was cooled to 4° C. in a conventional manner, 250 g of calcium chloride previously dissolved in water was added to the solution. The precipitate was formed and removed with a clarifier. 1N HCl was added to the supernatant to adjust its pH to 4.6 with stirring. The precipitate was formed and collected with a clarifier. After washing with water, the resulting precipitate was pressed, ground into powder and air-dried. The powder contained less $\alpha_S$ casein and was rich mainly in $\beta$ casein and $\kappa$ casein ($\alpha_S$ casein: 24%, $\beta$ casein: 56%, and $\kappa$ casein: 20%).

After 20 kg of the raw material obtained in Example 1 which was rich in the non-protein nitrogen components and $\alpha$-lactalbumin, 6.4 kg of the casein powder described above, 44.0 kg of lactose, 4.7 kg of soluble polysaccharides which are a starch hydrolyzate composed of mainly polysaccharides of 8 to 12 saccharide chain, and trace amounts of calcium chloride (calcium chloride, calcium lactate, calcium citrate, calcium hydroxide and calcium glycerophosphate may be used alone or in any combination) and water soluble vitamins: riboflavin, cyanocobalamin, calcium pantothenate, nicotinamide and sodium ascorbate were weighed, they were mixed with and dissoved in 525 kg of water. The solution was sterilized by heating in a conventional manner. After, the solution was concentrated to the solid content of 32%, 24.0 kg of a mixture comprising lard, coconut oil, palm oil and soybean oil, the mixture having a fatty acid composition similar to that in human milk and supplemented oil soluble vitamins: vitamin A, vitamin D, dl-$\alpha$-tocopherol and lecithin was added to the concentrate, followed by homogenization in a conventional manner. The homogenate was spray dried to give the final product. Analysis of the resulting powder in terms of nitrogen sources revealed that casein protein contained less $\alpha_S$ casein and was composed mainly of $\beta$ casein and $\kappa$ casein, and whey protein contained less $\beta$-lactoglobulin but was abundant in $\alpha$-lactalbumin, and furthermore, the non-protein nitrogen content was high. The product was extremely suitable as formulated milk for infants. Namely, the ratio of the amount of $\alpha_S$ casein to the amount or $\beta$ casein in the product was 1:2.33, and the ratio of the amount of $\beta$-lactoglobulin to the amount of $\alpha$-lactalbumin in the product was 1:3.34. The content of non-protein nitrogen was 1.51% in the product. The liquid formulated milk prepared by adding water to the product in order that the amount of the product could become 14% in the liquid formulated milk, had the non-protein nitrogen of 211 mg/dl. This amount corresponds to 83% of the non-protein nitrogen amount (255 mg/dl) in human milk (Donovan, S. M., and Lonnerdal, B., Fed. Proc., 44, 1167, 1985).

EFFECT OF THE INVENTION

According to the present invention, improvements in the quality of protein were made on conventional formulated milk compositions for infants analogous to human milk. The composition of casein and whey protein can be formulated closely to that of human milk. At the same time, the non-protein nitrogen content which was less in conventional formulated milk for infants can be increased to 60% or more of human milk. Therefore, the protein composition which was not practically realized hitherto can be made close to that of human milk.

While the invention has been described in detail and with reference to specific embodiments thereof, it is apparent to one skilled in the art that various changes and modifications can be made therein without departing from the spirit and the scope of the present invention.

What is claimed is:

1. In a method for producing a formulated milk composition for infants which is analogous to human milk, which formulated milk is prepared by mixing together whey protein concentrate, casein, lactose, soluble polysaccharide, fat, ash and vitamins, the improvement comprising using, as a material to increase the concentration of non-protein nitrogen in said formulated milk to 60% or more of non-protein nitrogen in human milk, a substance containing non-protein nitrogen components which are prepared by:

subjecting whey from which casein and fat have been removed to ultrafiltration to obtain a permeate;

concentrating said permeate;

removing lactose and desalting said concentrated permeate; and drying said permeate;

wherein the ratio of the amount of $\beta$-lactoglobulin to the amount of $\alpha$-lactalbumin is from 1:1 to 1:5.

2. In a method of producing a formulated milk composition for infants which is analogoms to human milk according to claim 1, further comprising mixing said concentrated permeate, prior to drying said concentrated permeate, with a product obtained by removing $\beta$-lactoglobulin from a whey protein concentrate obtained by ultrafiltration, such that the ratio of the amount of $\beta$-lactoglobulin to the amount of $\alpha$-lactalbumin in said formulated milk is from 1:1 to 1:5.

3. The method for producing a formulated milk composition for infants according to claim 1, wherein there is included a casein-containing product from which $\alpha_S$ casein has been removed such that the ratio of the amount of $\alpha_S$ casein to the amount of $\beta$ casein in said formulated milk is from 1:1 to 1:6.

4. The method for producing a formulated milk composition for infants according to claim 1, wherein there is included a protein-containing product from which $\beta$-lactoglobulin has been removed such that the ratio of $\beta$-lactoglobulin to the amount of $\alpha$-lactalbumin in said formulated milk is from 1:1 to 1:5 and a casein-containing product from which $\alpha_S$ casein has been removed, such that the ratio of the amount of $\alpha_S$ casein to the amount of $\beta$ casein in said formulated milk is from 1:1 to 1:6.

5. The method for producing a formulated milk composition for infants according to claim 2, wherein there is included a casein-containing product from which $\alpha_S$ casein has been removed, such that the ratio of the amount of $\alpha_S$ casein to the amount of $\beta$ casein in said formulated milk is from 1:1 to 1:6.

* * * * *